United States Patent [19]

Shinji et al.

[11] Patent Number: 5,284,353
[45] Date of Patent: Feb. 8, 1994

[54] INDEPENDENT SUSPENSION

[75] Inventors: Kawano Shinji, Yokohama; Nakajima Hiroshi, Sagamihara; Okamoto Kimio, Yokohama; Yanagisawa Mayumi, Tokyo, all of Japan

[73] Assignee: Yorozu Manufacturing Corporation, Yokohama, Japan

[21] Appl. No.: 741,445

[22] PCT Filed: Dec. 14, 1990

[86] PCT No.: PCT/JP90/01635
§ 371 Date: Aug. 7, 1991
§ 102(e) Date: Aug. 7, 1991

[87] PCT Pub. No.: WO91/08918
PCT Pub. Date: Jun. 27, 1991

[30] Foreign Application Priority Data

| Dec. 15, 1989 | [JP] | Japan | 1-323862 |
| Jan. 17, 1990 | [JP] | Japan | 2-6319 |
| Jan. 17, 1990 | [JP] | Japan | 2-6320 |
| Jan. 17, 1990 | [JP] | Japan | 2-6321 |
| Jan. 17, 1990 | [JP] | Japan | 2-6322 |
| Jan. 17, 1990 | [JP] | Japan | 2-6323 |

[51] Int. Cl.$^5$ ............................................ B60G 3/00
[52] U.S. Cl. ................................. 280/660; 280/691
[58] Field of Search ............ 280/688, 690, 691, 112.2, 280/660, 675, 673

[56] References Cited

U.S. PATENT DOCUMENTS

| Re. 21,605 | 10/1940 | Kolbe | 280/112.2 |
| 4,202,563 | 5/1980 | Tattermusch | 280/675 |
| 4,685,690 | 8/1987 | Fujita et al. | 280/112.2 |

FOREIGN PATENT DOCUMENTS

| 62-189211 | 12/1987 | Japan. | |
| 0056216 | 3/1989 | Japan | 280/673 |

Primary Examiner—Karin L. Tyson
Assistant Examiner—Paul Dickson
Attorney, Agent, or Firm—Mathews, Woodbridge & Collins

[57] ABSTRACT

An independent suspension for use in a front wheel or a rear wheel of an automobile is provided. It produces a varied characteristic of camber variation for a fixed roll center height and a fixed scuff variation and, consequently, improves freedom of suspension design and offers enhanced operational stability. An upper arm is divided into a knuckle side upper arm and a vehicle side upper arm, the two upper arms are interconnected so as to be shakeable in the direction of vertical movement of the wheel, and the vehicle side upper arm and a lower arm are interconnected through the medium of a rigid member having the opposite ends thereof adapted for free vibration. This independent suspension is particularly suitable for use in the Wishbone type independent suspension.

7 Claims, 18 Drawing Sheets

INDEPENDENT SUSPENSION

TECHNICAL FIELD

This invention relates to an independent suspension for use with front wheels or rear wheels in an automobile and more particularly to a Wishbone type independent suspension.

BACKGROUND ART

For the absorption of various vibrations and impacts exerted by a road surface to a traveling automobile, suspensions furnished with a buffer action are interposed between the automobile body and the axles. These suspensions fulfil important functions of supporting the automobile on the road surface, transmitting the propulsive force from drive wheels to the automobile body and, at the same time, moderating the impacts from the road surface and protecting the automobile against breakage, and further improving comfortableness of ride and stability of operation. With the growing trend of automobiles toward higher speeds, these functions have come to be viewed as factors of increasing significance capable of determining the limits to speed increase. Scientific studies are being promoted comprehensively on the system and have been developing numerous mechanisms and component elements as a consequence.

The suspensions are generally required to be pliable in the vertical direction and rigid in the longitudinal and lateral directions. From the structural point of view, they are broadly divided under two categories, i.e. the axle suspensions and the independent suspensions. The axle suspensions are generally used in front wheels and rear wheels of trucks and in rear wheels of passenger cars. In contrast, the independent suspensions are predominantly used in front wheels and rear wheels of passenger cars which attach primary importance to comfortableness of ride and stability of operation.

The independent suspensions are designed to allow laterally opposite wheels freedom of independent motion instead of requiring them to be interconnected through the medium of one axle. From the structural point of view, they may be broadly divided into Wishbone type, MacFarson type, trailing arm type, and swing axle type. These independent suspensions, as compared with the axle suspensions, have the advantage that when either of the laterally opposite wheels runs on an object projecting from the road surface, the independent suspension serving the particular wheel acts like the knee joint of man, enabling the wheel exclusively to jog vertically thereby preventing the automobile body from a tilt and allowing the automobile to operate stably by effectively avoiding the phenomenon of rolling.

In the various types of independent suspensions, the Wishbone type suspensions are used most widely as mentioned in Japanese Utility Model Application Disclosure SHO 53(1978)-26,020. The independent suspensions of this type are characterized by the fact that since the link mechanisms using two arms produce a parallelepipedal action, the wheels served by the suspensions move substantially vertically and the tires mounted thereon, therefore, contact horizontally the road surface at all times and enjoy a highly satisfactory road surface contact property. They are handicapped by weight and cost because of their complexity in structure as compared with the MacFarson type suspensions. Moreover, they have room for further improvement in respect that the two arms used in each suspension go to decreasing the inner volume of an engine room because they are adapted to thrust into the engine room. The advantage of the Wishbone type independent suspensions that they are robust structurally and excellent in operational stability manifested as during the cornering has come to attract attention again in recent years.

In order that the automobile bodies furnished with such Wishbone type suspensions may fulfil such requirements as alleviation of frictional wear of tires, ability to control the operation of steering, and prevention of transmission of vibrations to the steering handle, the lengths of an upper arm and a lower arm, the positions of fixation thereof (the distance separating them), etc. must be suitably selected.

The lengths of the upper arm and the lower arm and the positions of their fixation (the distance separating them), however, are restricted to a large extent by the spaces allocated to the layout of the upper arm and the lower arm in an automobile on which the suspensions are actually mounted. For the purpose of improving the stability of operation during a gyration, for example, the idea of disposing control arms in such a manner that the camber relative to the road decreases to 0(zero) degree even during the gyration may be conceived. It is, therefore, desirable to give the upper arm a suitable length such that the angle of vibration of the upper arm due to the vertical motion of the corresponding wheel will conform to the angle of vibration of the automobile body during a gyration. An addition to the length of the upper arm, however, results in inevitable protrusion into the engine room of a fulcrum serving to support pivotally the upper arm. Since the effort directed to improving the operational stability brings about serious adverse effects on the design of automobile style, the design of engine, etc., the conventional suspensions have been compelled to sacrifice their performance to a certain extent.

Further, in the conventional suspensions, the layout of the upper arm and the lower arm as viewed from the front side of the automobile body is univocally decided by the characteristic of variation in roll center height, the characteristic of variation in scuff, and the characteristic of variation in camber and the range of selection of the magnitude of each of these characteristics is extremely restricted by the magnitudes of the other two characteristics. The conventional suspensions, therefore, are destitute of freedom of design. A study of the layout of the upper arm and the lower arm whose characteristic of variation in camber is such as to give 0(zero) degree as the angle of camber relative to the road, for example, reveals that this layout degrades the operational stability during a gyration because it results in an undue increase of the variation in scuff and consequently aggravates the lateral vibration of the automobile body or the displacement of the roll center.

Further, it is desirable as described above that the camber angle of the wheels should vary, during a gyration, in the direction of negative camber proportionately to the angle of vibration of the automobile body so as to reduce the angle of camber to 0(zero) degree relative to the road. When any of the wheels, during a straight travel of the automobile, runs on an object projected from the road surface and generates a bump stroke exceeding a stated limit, the wheel gives rise to a camber thrust. It may well be concluded, therefore, that the control of the inclination toward negative camber is desirably started at the time of occurrence of this camber thrust for the sake of improving the operational stability during the straight travel. Since the conventional suspensions show a large inclination toward negative camber in proportion as the vertical stroke of wheel increases, they have never been able to satisfy simultaneously the operational stability during a gyration and the operational stability during a straight travel.

In the independent suspensions of the types disclosed in Japanese Patent Application Disclosure SHO 64(1989)-189710, Japanese Utility Model Application Disclosure SHO 62(1987)-189,904, etc., for example, a link is interposed between an upper arm and a knucle and this link and a lower arm are interconnected through the medium of a connecting link so that the optimum camber characteristic to be required may be attained by causing the link to produce a rotational displacement and impart a lateral displacement to one end part of the knuckle proportionately to the vertical vibrations of the upper arm and the lower arm. The adoption of a link mechanism of this nature, however, is not desirable for the construction of suspensions because this link mechanism exerts a draft in the axial direction on the ball joint disposed in the connecting part of the knuckle.

DISCLOSURE OF INVENTION

The present invention has been produced in view of the problem of the prior art described above and has as an object thereof the provision of suspensions which are capable of giving an altered characteristic of variation in camber to a fixed roll center height and a fixed scuff variation, conspicuously improving the freedom of design of suspensions, and satisfying the operational stability in terms of design.

This object is accomplished by a Wishbone type independent suspension provided with a pair of control arms, namely an upper arm and a lower arm, having the leading ends thereof pivotally connected to a knuckle fastened to a wheel and the basal ends thereof pivotally attached to a vehicle side, which independent suspension is characterized by the fact that the upper arm is divided into a knuckle side upper arm and a vehicle side upper arm, these two upper arms interconnected in such a manner as to be freely moveable direction of vertical the stroke of the wheel, and the vehicle side upper arm and the lower arm are interconnected through the medium of a rigid member having the opposite ends thereof adapted for free vibration.

The object described above is further accomplished by a Wishbone type independent suspension provided with a pair of control arms, namely an upper arm and a lower arm, having the leading ends thereof pivotally connected to a knuckle fastened to a wheel and the basal ends thereof pivotally attached to a vehicle side, which independent suspension is characterized by the fact that the upper arm is divided into a knuckle side upper arm and a vehicle side upper arm, one end of a rigid member is connected to the vehicle side upper arm in such a manner as to be freely movable in the direction of vertical stroke of the wheel and, at the same time, the other end of the rigid member is connected to the lower arm in such a manner as to be freely movable in the direction of vertical stroke of the arm, and one end of the knuckle side upper arm is pivotally connected to the rigid member.

BEST MODE FOR CARRING OUT THE INVENTION

Now, the embodiments of the present invention will be described specifically below with reference to the accompanying drawings.

FIRST EMBODIMENT

Figure 1:
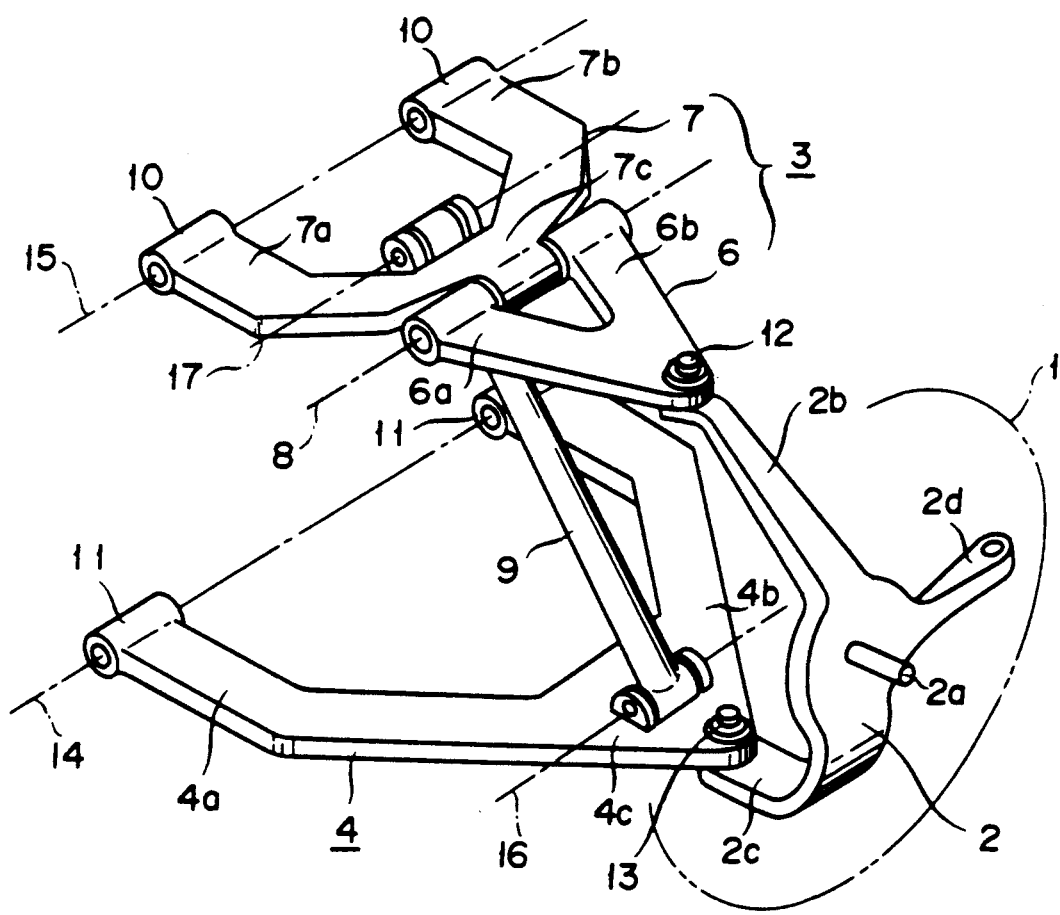
FIG. 1 is a perspective view illustrating the first embodiment of the present invention.
Figure 2:
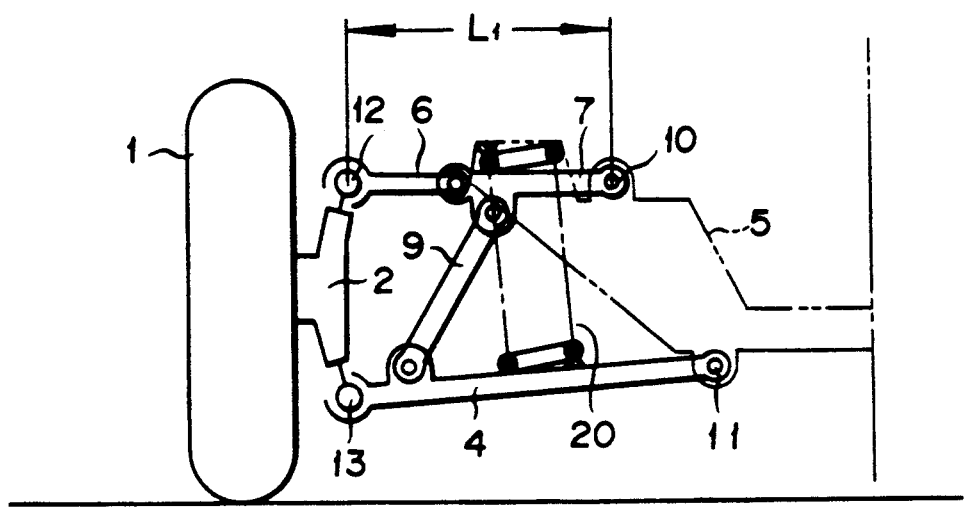
FIG. 2 and FIG. 3 are type diagrams for illustration of the first embodiment.
Figure 3:
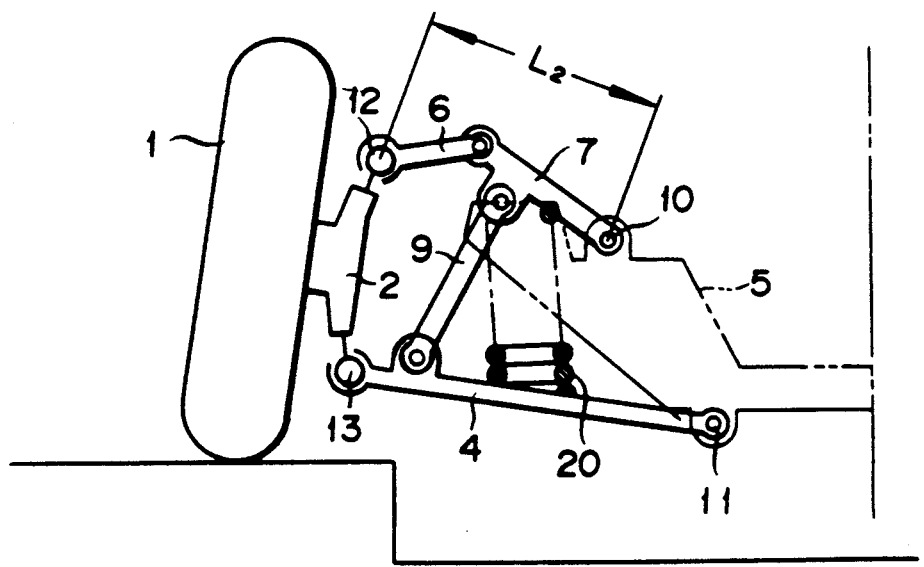

FIG. 1 is a perspective view illustrating the first embodiment of the present invention and FIG. 2 and FIG. 3 are type diagrams for illustration of the operation of the embodiment.

A knuckle 2 having a wheel 1 rotatably attached thereto comprises a spindle 2a for supporting the wheel 1 through the medium of a bearing (not shown), yoked arms 2b, 2c extended from the basal end of the spindle as branched into the upper and lower directions, and a knuckle arm 2d having a steering mechanism (not shown) connected thereto and serving to produce a suitable alteration in the steering angle of the wheel 1. To the leading ends of the yoked arms 2b, 2e, two A type control arms 3, 4 are connected through the medium of ball joints 12, 13 as illustrated in FIG. 1 so that the knuckle 2 remains to be pivotable relative to the control arms 3, 4 even when the wheel 1 produces a vertical movement or when the wheel 1 is driven by a steering mechanism. Also, the caster existent during a quiescent standing of the automobile body is decided by the rectilinear inclination interconnecting the centers of the two ball joints 12, 13.

The lower arm 4 is the so-called A type arm which is divided on the basal end side thereof into a pair of front and rear arm parts 4a, 4b. The arm parts 4a, 4b of the A type lower arm 4 are attached through the medium of a bush 11 to a body or a frame 5 and are rotated around a vibrating axis 14 in spite of the shear strength of the bush 11. A spring device 20 is interposed as illustrated in FIG. 2 between the lower arm 4 and the frame 5 so as to urge the lower arm 4 downwardly.

The upper arm 3 which is involved in the present embodiment comprises a knuckle side upper arm 6 and a vehicle side upper arm 7, which each comprise an A type arm. These two upper arms 6, 7 are formed by having arm parts 6a, 6b of the knuckle side upper arm 6 connected to a leading end part 7c of the vehicle side upper arm 7 by means of a vibrating axis 8. Around this vibrating axis 8, the knuckle side upper arm 6 and the vehicle side upper arm 7 are revolved relative to each other. Arm parts 7a, 7b which constitute the basal end of the vehicle side upper arm 7 are connected to the body or frame 5 by means of a bush 10 (FIG. 2) in the same manner as the lower arm 4 mentioned above. Around a vibrating axis 15, the vehicle side upper arm 7 is revolved. The knuckle side upper arm 6, therefore, is revolved around the vibrating axis 8 relative to the vehicle side upper arm 7, while it is revolved around the vibrating axis 15 through the medium of the vehicle side upper arm 7 relative to the body (frame 5).

In the suspension of the present embodiment, the leading end 4c of the lower arm 4 and the leading end 7c of the vehicle side upper arm 7 are interconnected by means of a rigid member 9. The rigid member 9 and the lower arm 4 are interconnected in such a manner that the rigid member 9 is revolved around a vibrating axis 16 relative to the lower arm 4. The rigid member 9 and the vehicle side upper arm 7 are interconnected in such a manner that the rigid member 9 is revolved around a vibrating axis 17 relative to the vehicle side upper arm 7.

As described above, the vehicle side upper arm 7, the knuckle side upper arm 6, the knuckle 2, and the rigid member 9 jointly constitute a link mechanism.

Now, the operation of the suspension of the present embodiment will be described below.

FIG. 2 is a half front view typically illustrating the suspension of the present embodiment attached to an automobile as viewed from the front side of the vehicle and FIG. 3 is a half front view typically illustrating the suspension of the same embodiment posed after the wheel has been moved to an upper position.

During a straight travel of the automobile, the length of the upper arm 3 is the rectilinear length L1 from the ball joint 12 to the bush 10 as illustrated in FIG. 2. When the automobile body is gyrated from the state of straight travel or when the wheel 1 runs on an object projected from the road surface, the position of the wheel 1 relative to the frame 5 moves upwardly and the lower arm 4 consequently revolves upwardly around the bush 11. As a result, the rigid member 9 attached to the lower arm 4 pushes the vehicle side upper arm 7 upwardly. At this time, the angle of vibration of the lower arm 4 differs from the angle of vibration of the vehicle side upper arm 7 in the present embodiment because the length from the bush 11 to the lower end of the rigid member 9 is set to differ from the length from the bush 10 to the upper end of the rigid member 9. As a result, the vibrating axis 8, namely the connecting part between the vehicle side upper arm 7 and the knuckle side upper arm 6, is bent by a stated angle and the length of the upper arm 3 equals the rectilinear length L2 from the ball joint 12 to the bush 10, which is shorter by a stated length than the length existent during a straight travel. As a result, the wheel 1 assumes a stated camber angle.

In the suspension of the present embodiment, the characteristic of variation in camber can be altered even for a fixed roll center height and a fixed scuff variation by suitably selecting the lengths of the vehicle side upper arm 7 and the knuckle side upper arm, the length of the rigid member 9, and the positions for attachment of the upper and lower ends of the rigid member 9 without requiring any change in the positions for attachment of the upper arm 3 and the lower arm 4 to the frame 5, the positions for attachment thereof to the knuckle 2, or the lengths of the two arms 3, 4. Thus, the suspension enjoys conspicuously improved freedom of design and highly satisfactory operational stability.

Moreover, the possibility that a drawing force will be exerted upon the ball joints 12, 13 in the axial direction of the ball stud is nil because the knuckle side upper arm 6 is bent with the vibrating axis 8 as an axis when the upper arm 3 and the lower arm 4 are vibrated and the rigid member 9 is caused to push the vehicle side upper arm 7 upwardly.

SECOND EMBODIMENT

Figure 4:
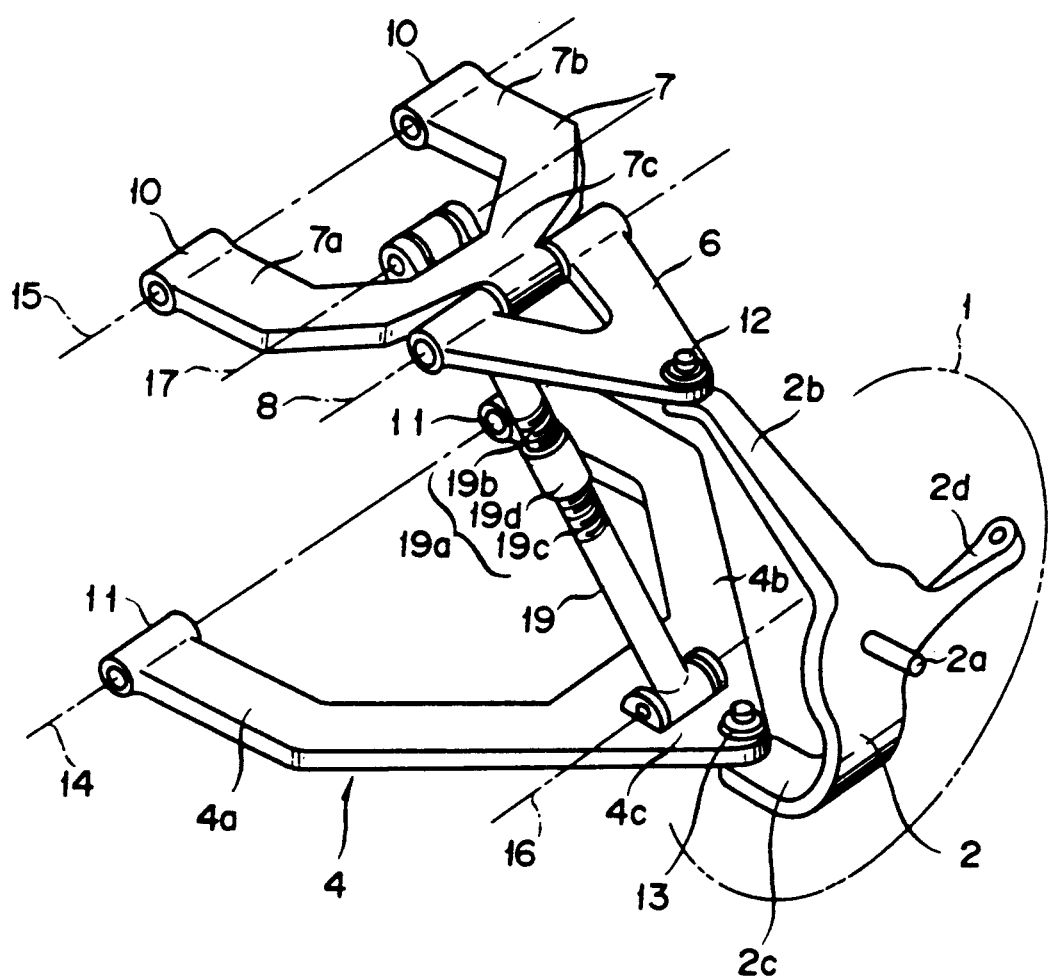
FIG. 4 is a perspective view illustrating the second embodiment of the present invention.
Figure 5:
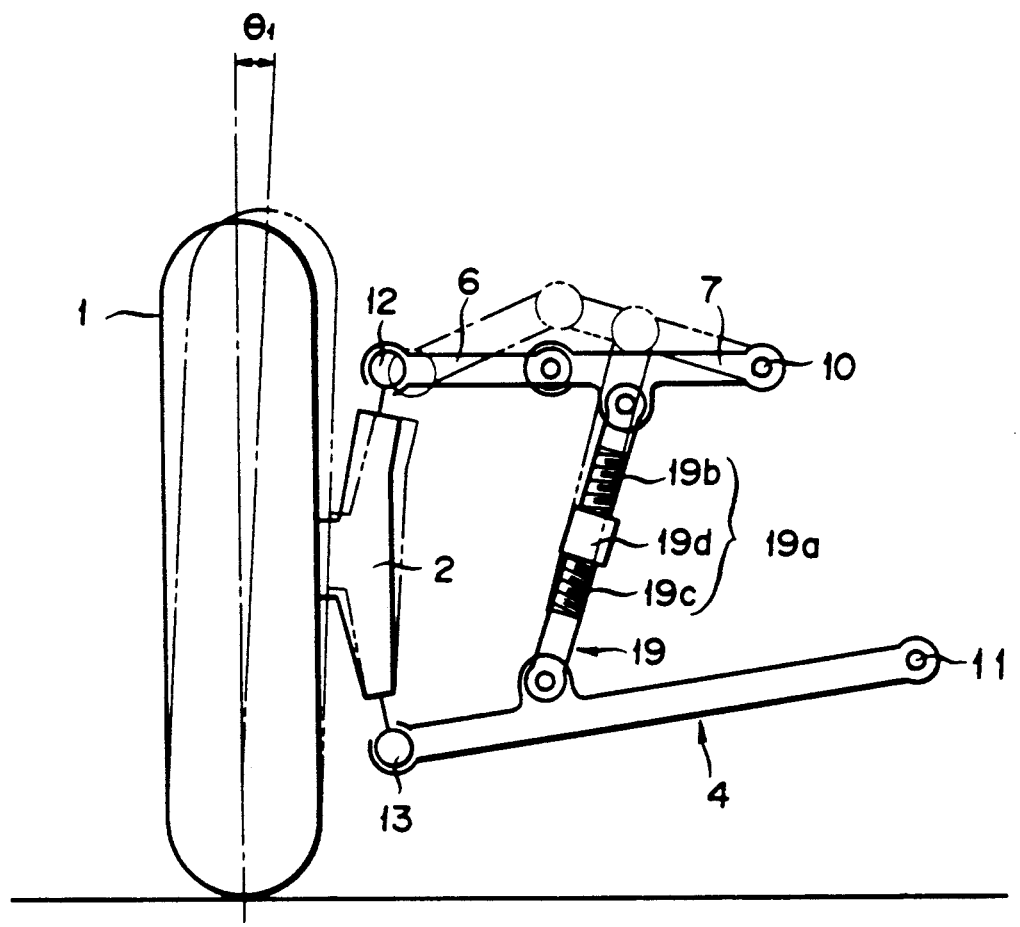
FIG. 5 is a type diagram for illustration of the second embodiment.

FIG. 4 is a perspective view illustrating the second embodiment of the present invention and FIG. 5 is a type diagram for illustration of the operation of this embodiment. In these diagrams, the same component parts as those of the suspension of the first embodiment illustrated in FIGS. 1 to 3 are denoted by the same reference numerals.

In the present embodiment, the wheel 1, the knuckle 2, the upper arm 3 (the knuckle side upper arm 6 and the vehicle size upper arm 7), and the lower arm 4 are constructed identically to the corresponding component parts of the first embodiment and, therefore, are omitted from the following description of this embodiment.

The difference of the present embodiment in construction from the first embodiment resides in a rigid member 19. To be specific, the rigid member 19 involved in the present embodiment has a turnbuckle 19a formed in the central part thereof. The turnbuckle 19a comprises a right-handed screw 19b and a left-handed screw 19c both formed on the rigid member 19 and a coupler 19d helically fitted to these screws. The rigid member 19 is contracted or extended by rotating the coupler 19d in either direction and the rigid member 19 is conversely deformed by rotating the coupler 19d in the other direction. The means for extending or contracting the rigid member 19 is not limited to the turnbuckle 19a but may be some other device capable of extension or contraction.

Now, the function derived from expansibly constructing the rigid member 19 will be described below.

FIG. 5 is a half cross section typically illustrating the suspension of the present embodiment as viewed from the front side of the vehicle. In the diagram, the solid line represents the suspension in the state existent before the rigid member 19 is extended and the two-dot chain line represents the suspension in the state existent after the rigid member 19 is extended.

When the length of the rigid member 19 is increased by rotating the coupler 19d of the turnbuckle 19a in the state represented by the solid line of FIG. 5, the rigid member 19 pushes the vehicle side upper arm 7 upwardly and the rectilinear length from the connecting part of the upper arm 7 to the knuckle 2 to the connecting part thereof to the automobile body (not shown) is varied proportionately to the change in the length of the rigid member 19, with the result that the camber angle of the wheel can be mainly adjusted (indicated as "θ1" in FIG. 5).

The suspension of the present embodiment, therefore, is capable of very easy adjustment of the camber angle because the camber angle can be mainly adjusted by extending or contracting exclusively the length of the rigid member 19 as described above.

THIRD EMBODIMENT

Figure 6:
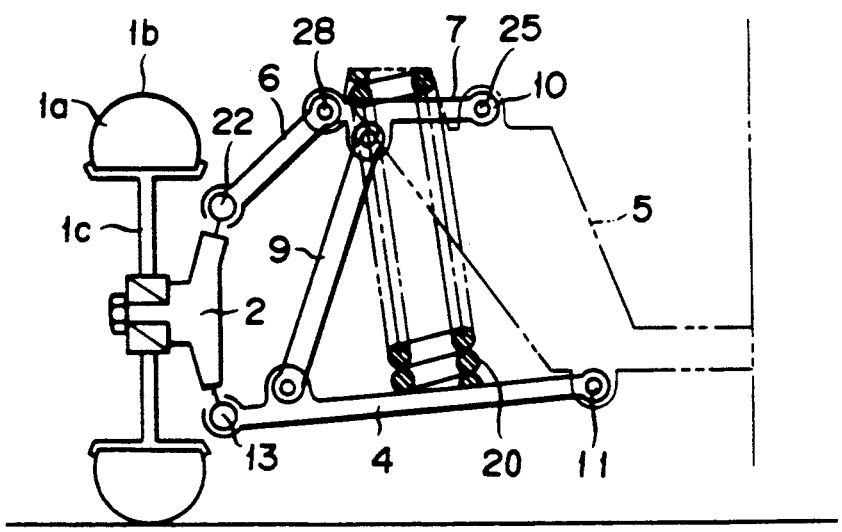
FIG. 6 and FIG. 7 are type diagrams for illustration of the operation of the third embodiment of the present invention.
Figure 7:
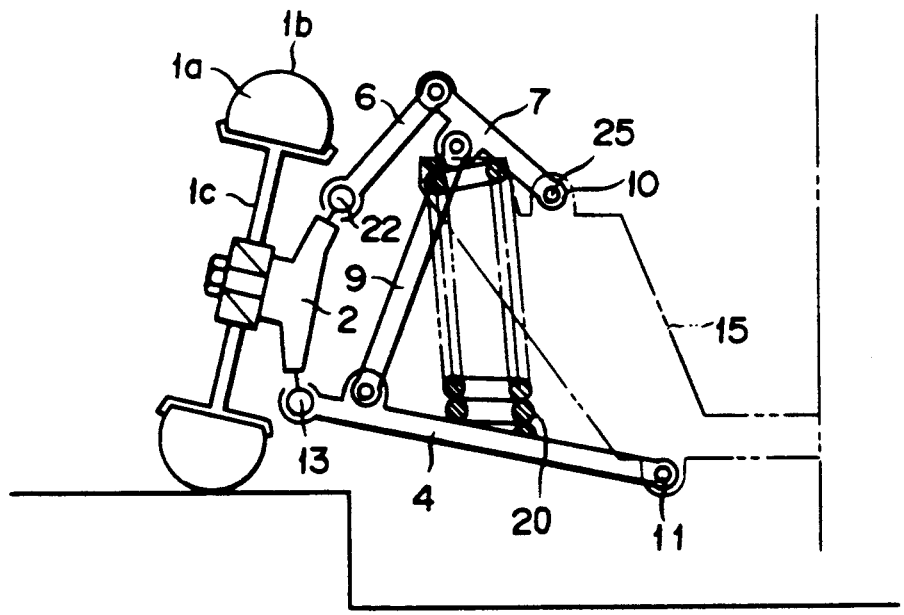

FIG. 6 and FIG. 7 are type diagrams for illustration of the operation of the third embodiment of the present invention; FIG. 6 being a half front view illustrating typically the suspension of the present embodiment attached to an automobile as viewed from the front side of the vehicle and FIG. 7 a half front view illustrating typically the suspension of the present embodiment as posed after upward movement of the wheel. In these diagrams, the same component parts as those of the suspension of the first embodiment illustrated in FIGS. 1 to 3 are denoted by the same reference numerals.

The wheel 1, the knuckle 2, the upper arm 3 (the knuckle side upper arm 6 and the vehicle side upper arm 7), the lower arm 4, and the rigid member 9 are constructed identically to the corresponding parts of the first embodiment described above and, therefore, are omitted from the following description of the present embodiment.

The difference of the present embodiment in construction from the first embodiment resides in the positions for attachment of a ball joint 22, a vibrating axis 28, and a vibrating axis 25. To be specific, the ball joint 22 is disposed inside of an external peripheral edge lb of the wheel 1, particularly inside a wheel 1c, as illustrated in FIG. 6, for protection against the dust and water which the tire 1a hurls during a travel of the automobile.

Further, the positions for the attachment of the vibrating axis 28 and the vibrating axis 25 in the present embodiment are set at higher levels in the vertical direction of the automobile body than the position for the attachment of the ball joint 22 described above. Heretofore, the idea of high-mounting the upper arm 3 has been conceived for the purpose of heightening the rigidity of a suspension to the extent of withstanding the external force exerted in the lateral direction on the wheel 1 during a gyration of an automobile. This concept has failed to afford a suitable construction capable of simultaneously satisfying rigidification of a suspension and protection of a ball joint because the high-mounting inevitably requires the ball joint 22 to be seated outside the wheel 1, i.e. a site susceptible of the influence of the muddy water splashed by the tire 1a. The desire to dispose the ball joint 22 inside of the outer peripheral edge 1b of the wheel 1, however, can be fulfilled by dividing the upper arm 3 into the vehicle side upper arm 7 and the knuckle side upper arm 6 as in the present embodiment. The rigidification of the suspension can be realized by arbitrarily setting the roll center of the automobile body and, at the same time, high-mounting the vehicle side upper arm 7.

Further, in the present embodiment, since the ball joint 22 is positioned inside of the outer peripheral edge 1b of the wheel 1, the otherwise inevitable infiltration of dust, water, etc. into the ball joint 22 is precluded. Besides, since a position 10 for the attachment of the vehicle side upper arm 7 to the automobile body and a position for the attachment of the vehicle side upper arm 7 to the knuckle side upper arm 6 are set at levels higher in the vertical direction of the automobile body than the ball joint 22, the rigidity of the suspension necessary for withstanding the external force exerted by the wheel 1 in the lateral direction on the suspension is heightened.

The suspension of the present embodiment, as described above, excels in rigidity and, at the same time, provides ample protection for the ball joint.

FOURTH EMBODIMENT AND FIFTH EMBODIMENT

Figure 8:
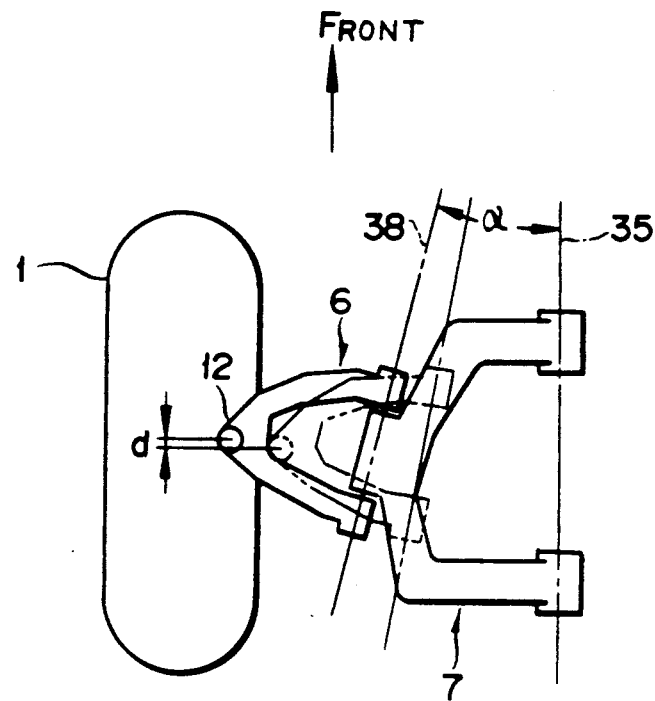
FIG. 8 is a plan view illustrating an upper arm in the fourth embodiment of the resent invention.
Figure 10:
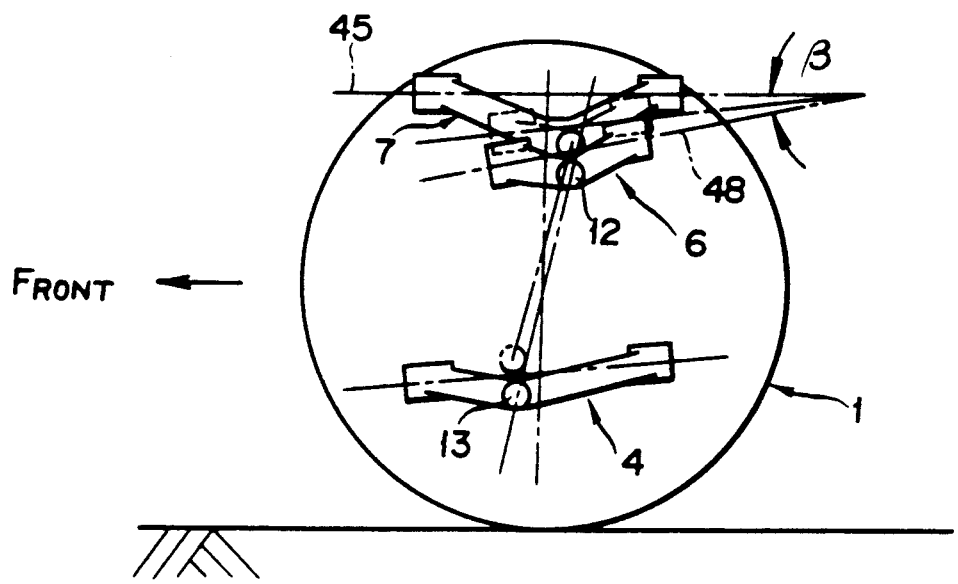
FIG. 10 is a side view illustrating control arms in the fifth embodiment of the present invention.
Figure 9:
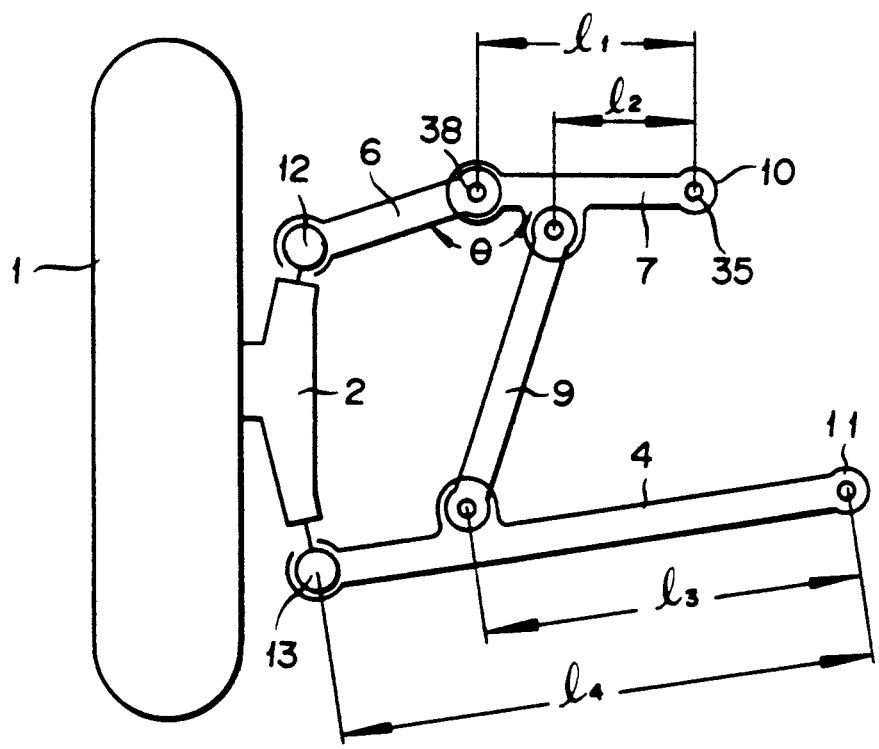
FIG. 9 is a type diagram illustrating the fourth embodiment.
Figure 11:
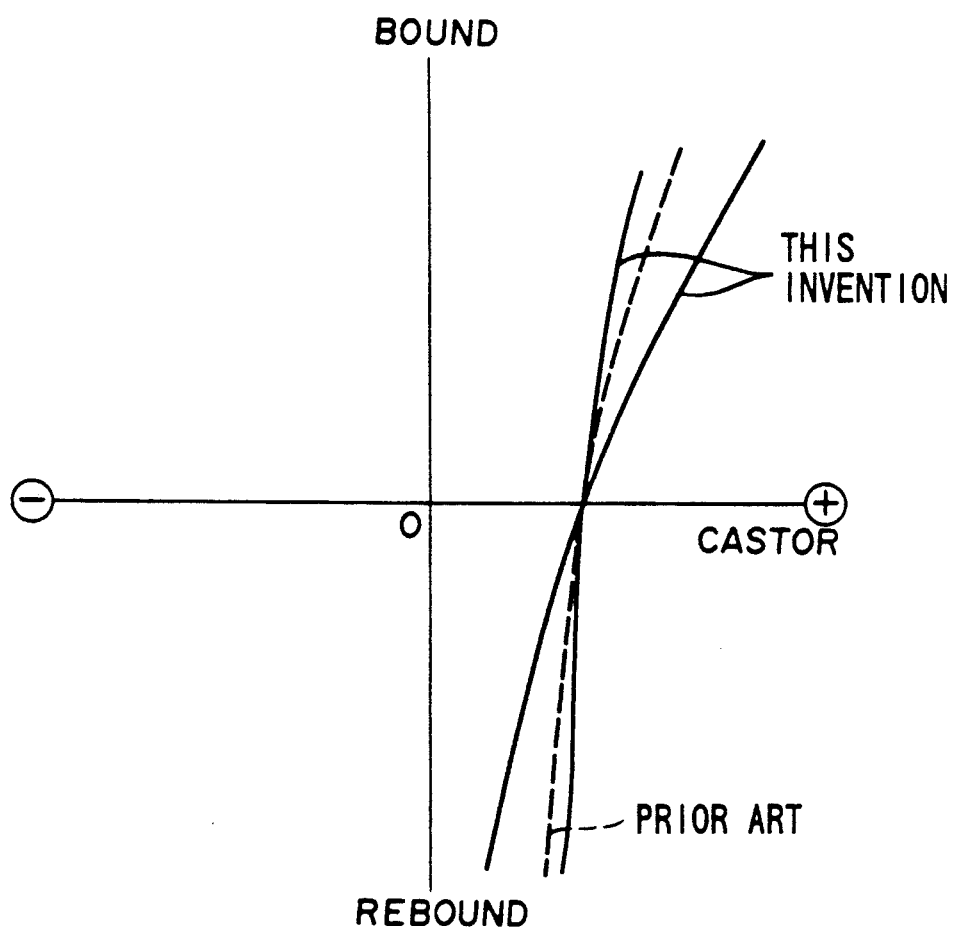
FIG. 11 is a graph showing the change in caster angle relative to the amount of bound, for the fourth embodiment and the fifth embodiment.

FIG. 8 is a plan view illustrating an upper arm in the fourth embodiment of the present invention, FIG. 9 is a type diagram illustrating the same embodiment, FIG. 10 is a side view illustrating a control arm in the fifth embodiment of the present invention, and FIG. 11 is a graph showing the change in caster angle relative to the amount of bound, for the fourth and fifth embodiments. In these diagrams, the same component parts as those of the suspension of the first embodiment are denoted by the same reference numerals.

The wheel 1, the knuckle 2, the upper arm 3 (the knuckle side upper art 6 and the vehicle side upper arm 7), the lower arm 4, and the rigid member 9 are constructed identically to the corresponding component parts in the first embodiment described above and, therefore, are omitted from the following description of the present embodiments.

The difference of the present embodiments in construction from the first embodiment resides in the angle of attachment of a vibrating axis 38 to a vibrating axis 35.

Specifically, in the fourth embodiment illustrated in FIG. 8, the vibrating axis 38 for the two upper arms 6, 7 is inclined as viewed in a plane by a stated angle a from the vibrating axis 35 for the vehicle side upper arm 7. Particularly in this case, the vibrating axis 38 is inclined divergently toward the rear side of the automobile body and the two vibrating axises 38, 35 are disposed substantially parallelly to each other as observed in the side view of the automobile body.

In the fourth embodiment constructed as described above, the angle of inclination of the line interconnecting the point of connection 12 of the knuckle 2 to the knuckle side upper arm 6 and the point of connection 13 of the knuckle 2 to the lower arm 4 as observed in the side view of the automobile body is fixed at a stated magnitude as a castor angle.

When the automobile body is gyrated in this state or when the wheel runs on an object projected from the road surface, for example, the position of the wheel 1 relative to the automobile body is moved upwardly and the lower arm 4 is consequently revolved upwardly around the vibrating axis 14 of the automobile body as the center.

As a result, the rigid member 9 attached to the lower arm 4 is made to push up the vehicle side upper arm 7. At this time, the vibrating axis 38 for the vehicle side upper arm 7 and the knuckle side upper arm 6 is revolved around the vibrating axis 35 of the vehicle side upper arm 7 relative to the automoblie body as the center. In this case, since the vibrating axis 38 for the two upper arms 6, 7 is disposed as inclined by the stated angle a from the vibrating axis 35 of the vehicle side upper arm 7 relative to the automobile body, the connecting part 12 of the knuckle side upper arm 6 to the knuckle 2 is moved forwardly or backwardly relative to the automobile body by a stated amount d as observed in the side view of the automobile body.

The caster variation during a gyration of the automobile body, therefore, is adjusted by suitably altering the angle of inclination a of the vibrating axis 38 for the vehicle side upper arm 7 and the knuckle side upper arm 6 through selection of the lengths of the vehicle side upper arm 7 and the knuckle side upper arm 6, the length of the lower arm 4, or the length or the position for attachment of the rigid member 9.

Particularly, the fourth embodiment illustrated in FIG. 8 brings about the following effect (FIG. 9).

The angle $\theta$ formed between the vehicle side upper arm 7 and the knuckle side upper arm 6 is decreased and the caster variation is consequently increased when the wheel 1 is in a bound state by setting the vibrating axis 38 above the ball joint 12 while the automobile body is at rest and attaching the rigid member 9 roughly so as to satisfy the following relation.

$$l3 / l4 > l2 / l1$$

The angle $\theta$ formed between the vehicle side upper arm 7 and the knuckle side upper arm 6 is increased and the caster variation is consequently increased when the wheel 1 is in a bound state by setting the vibrating axis 38 below the ball joint 12 while the automobile body is at rest and attaching the rigid member 9 roughly in the state satisfying the following relation.

$$l3 / l4 < l2 / l1$$

In contrast, the caster variation can be minimzed by setting the vibrating axis 38 at a height substantially equal to the height of the ball joint 12.

As described above, the suspension involved in the present embodiment is such that the caster angle relative to the amount of bound can be extensively varied as by adjusting the conditions of attachment of various component parts of the suspension as illustrated in FIG. 11.

Now, the fifth embodiment will be described below.

FIG. 10 is a side view illustrating the suspension of the fifth embodiment. In this embodiment, a vibrating axis 48 for the vehicle side upper arm 7 and the knuckle side upper arm 6 is inclined by a stated angle relative to a vibrating axis 45 of the vehicle side upper arm 7 as observed in the side view. Particularly in this case, the vibrating axis 48 is inclined downwardly toward the front as illustrated in FIG. 10 and, at the same time, the two vibrating axises 48, 45 are disposed substantially parallelly to each other as observed in the plan view of the automobile body. The construction of this suspension is identical in the other respect to that of the suspension of the fourth embodiment and, therefore, is omitted from the following description.

In the fifth embodiment constructed as described above, the position of attachment of the control arm to the automobile body can be freely selected and the caster variation during a gyration (bounding) can be set as desired in spite of the layout condition of the suspension similarly to the fourth embodiment described above.

Especially in the case of the fifth embodiment, the angle $\theta$ formed between the vehicle side upper arm 7 and the knuckle side upper arm 6 is decreased and the caster variation is consequently increased while the wheel 1 is in a bound state by setting the vibrating axis 48 below the ball joint 12 while the automobile body is at rest and, at the same time, attaching the rigid member 9 roughly in the state satisfying the following relation.

$$l3 / l4 > l2 / l1$$

The fourth and fifth embodiments are constructed so that the vibrating axises 38, 48 are inclined respectively as observed in the plan view of the automobile body and in the side view thereof. Optionally, they may be constructed so that their inclination in the plan view and their inclination in the side view my be simultaneously produced. This fact adds further to the desirability of freedom of design of the caster variation.

This particular construction may be applied to the suspension involved in the eighth embodiment which will be described specifically hereinbelow.

SIXTH EMBODIMENT

Figure 12:
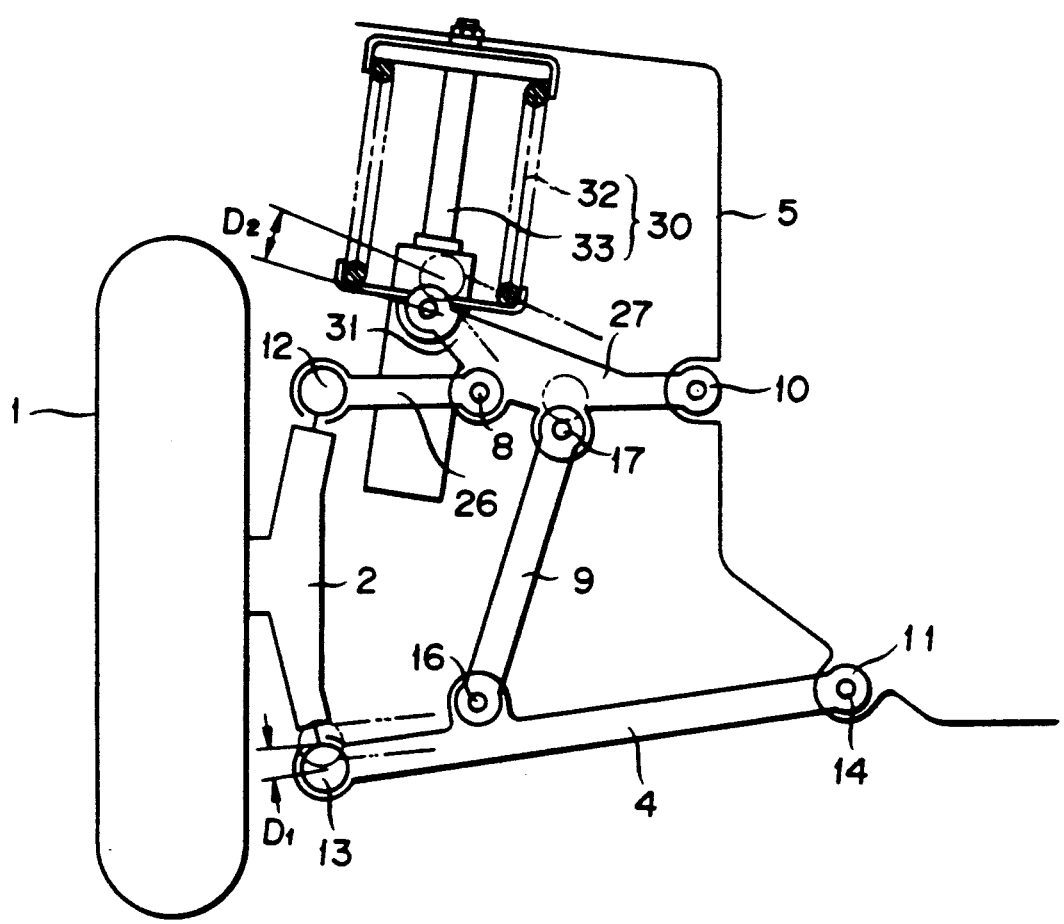
FIG. 12 is a type diagram illustrating the sixth embodiment of the present invention.

FIG. 12 is a type diagram illustrating the sixth embodiment of the present invention. In the diagram, the same component parts as those of the suspension of the first embodiment illutrated in FIGS. 1 to 3 are denoted by the same reference numerals.

The wheel 1, the knuckle 2, the lower arm 4, and the rigid member 9 in the present embodiment are constructed identically to the corresponding component parts of the first embodiment described above and will be omitted from the following description.

The difference of the present embodiment in construction from the first embodiment resides in an upper arm (a knuckle side upper arm 26 and a vehicle side upper arm 27) and a spring device 30. Specifically, a projecting part 31 is formed at the leading end of the vehicle side upper arm 27 and the spring device 30 comprising a spring 32 and a shock absorber 33 is interposed between the projecting part 31 and the automobile body 5.

In the sixth embodiment constructed as described above, when the position of the wheel 1 relative to the automobile body 5 is moved upwardly as illustrated in FIG. 12, the lower arm 4 is consequently revolved upwardly around the vibrating axis 14 with the automobile body 5 as the center (as indicated by the symbol "D1" in FIG. 12). As a result, the rigid member 9 attached to the lower arm 4 is made to push up the vehicle side upper arm 27. At this time, the amount of movement D2 of the projecting part 31 formed at the leading end of the vehicle side upper arm 27 becomes larger than the amount of movement D1 of the lower arm 4. This is because the suspension of the present embodiments has the function of varying the angle of vibration of the vehicle side upper arm 27 relative to the angle of vibration of the lower arm 4 through suitable alteration of the length of the lower arm 4, the length of the vehicle side upper arm 27, the positions for attachment of the lower end and the upper end of the rigid member 9, or the protruding length of the projecting part 31.

Owing to this function, the spring modulus of the spring device 30 can be set at a small value, the damping power of the shock absorber 33 can be set at a small magnitude, and the spring device 30 itself can be accordingly miniaturized.

SEVENTH EMBODIMENT

Figure 13:
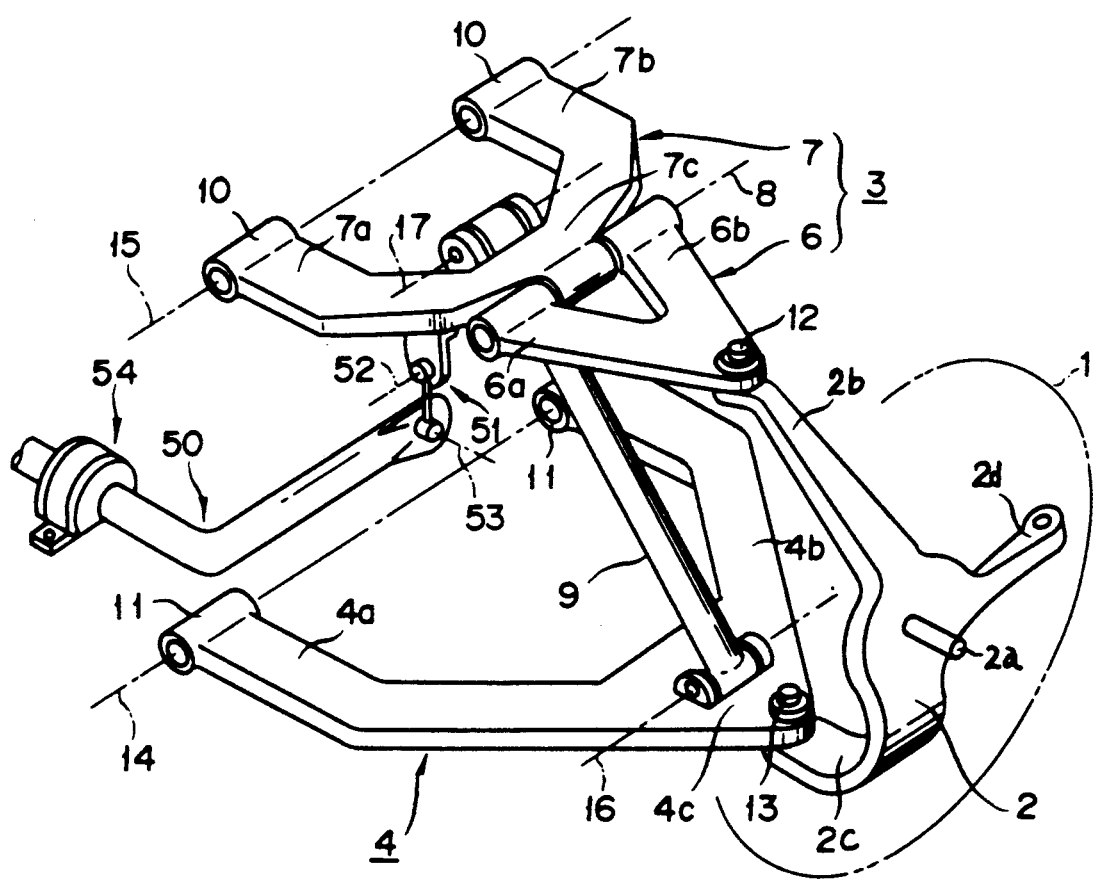
FIG. 13 is a perspective view illustrating the seventh embodiment of the present invention.
Figure 14:
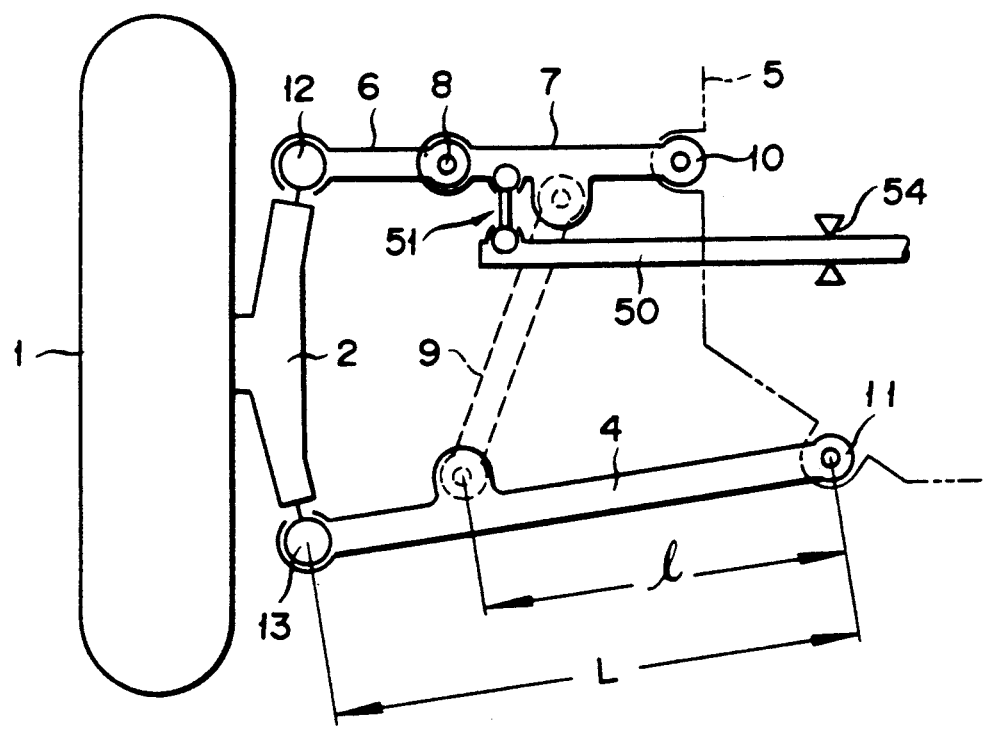
FIG. 14 is a type diagram for illustration of the operation of the seventh embodiment.

FIG. 13 is a perspective view illustrating the seventh embodiment of the present invention and FIG. 14 is a type view for illustration of the operation of the same embodiment. In these diagrams, the same component parts as those of the suspension of the first embodiment illustrated in FIGS. 1 to 3 are denoted by the same reference numerals.

The wheel 1, the knuckle 2, the upper arm 3, the lower arm 4, and the rigid member 9 of the present embodiment are constructed identically to the corresponding component parts of the first embodiment described above and, therefore, will be omitted from the following description.

The difference of the present embodiment in construction from the first embodiment resides in the additional incorporation of a stabilizer 50 in the suspension.

In the suspension of the present embodiment, the leading end of the stabilizer 50 which is a torsion bar is attached through the medium of a joint 51 to a point near the leading end of the vehicle side upper arm 7. This joint 51 is so constructed as to be freely rotated around an axis 52 at the site of attachment thereof to the vehicle side upper arm 7. It is also so constructed as to be freely rotated around an axis 53 at the site of attachment thereof to the stabilizer 50. Owing to this construction, the stabilizer 50 is allowed to follow the vertical movement of the vehicle side upper arm 7 and consequently confer appropriate restoring power on the vehicle side upper arm 7 and accordingly on the wheel 1. The other end of the stabilizer 50 is similarly attached to the other wheel. The middle portion of the stabilizer 50 is supported on the automobile body through the medium of bushes 54, 54 (only one of which is shown in the diagram).

Now, the operation of the suspension of the present embodiment will be described below.

When the automobile is gyrated or when one of the opposite wheels runs on an object projecting from the road surface of falls in a pit in the road surface, the position of the wheel 1 relative to the automobile body 5 is moved upwardly or downwardly. As a result, the lower arm 4 is revolved upwardly or downwardly around the vibrating axis 14 as the center. Then, the rigid member 9 attached to the lower arm 4 is made to push up the vehicle side upper arm 7 and the vehicle side upper arm 7 is consequently revolved around the vibrating axis 15.

In this case, since the suspension of the present embodiment has the function of allowing the angle of vibration of the vehicle side upper arm 7 relative to the angle of vibration of the lower arm 4 to be varied as desired by suitably altering the length of the lower arm 4 (indicated by the symbol "L" in FIG. 14), the length of the vehicle side upper arm 7, and the positions of attachment of the lower end (indicated by the symbol "l" in FIG. 14) and the upper end of the rigid member 9, the impartation of the restoring power to the suspension can be accomplished by attaching the leading end of the stabilizer 50 to a point near the leading end of the vehicle side upper arm 7 in the same manner as when this attachment is made to a point near the leading end of the lower arm 4.

In the design of a suspension, therefore, even when the position for attachment of the stabilizer 50 or the union thereof with the adjacent component parts is conspicuously restricted, a suspension capable of producing desired restoring power can be obtained by suitably selecting the length of the lower arm 4, the length of the vehicle side upper arm 7, and the positions for attachment of the lower end and the upper end of the rigid member 9, for example.

EIGHTH EMBODIMENT

Figure 15:
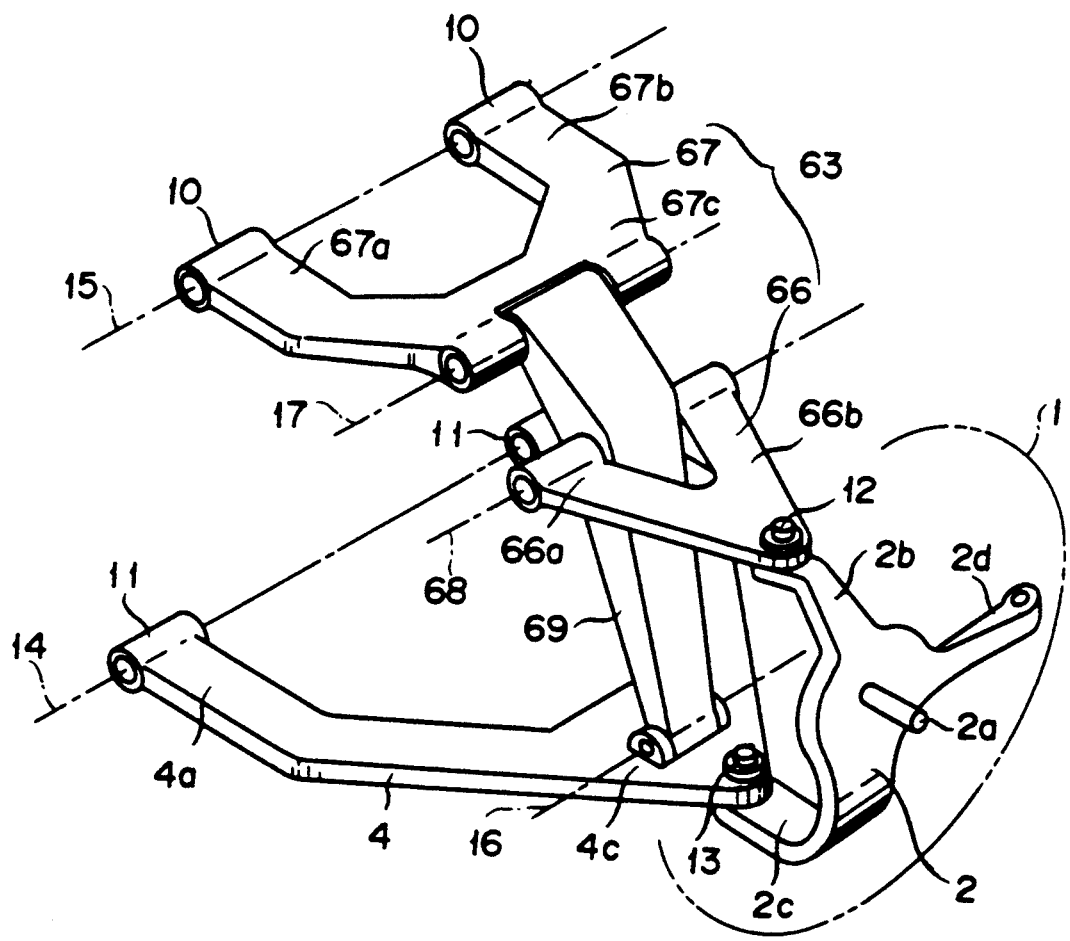
FIG. 15 is a perspective view illustrating the eighth embodiment of the present invention.
Figure 16:
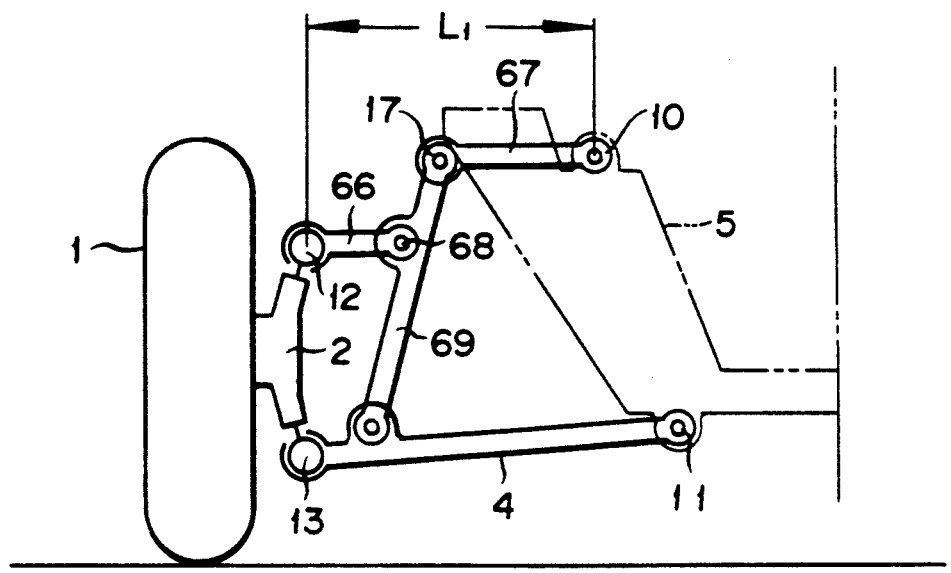
FIG. 16 and FIG. 17 are type diagrams for illustration of the operation of the eighth embodiment.
Figure 17:
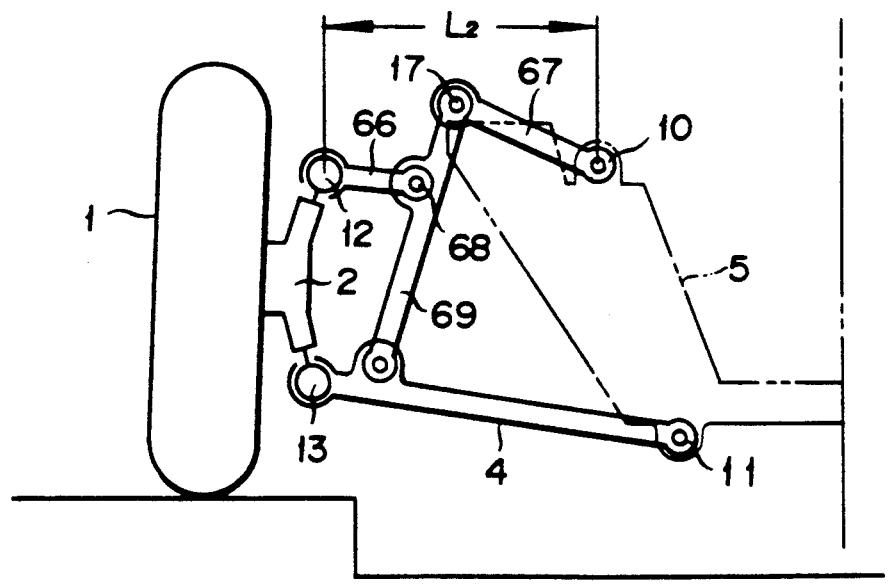

FIG. 15 is a perspective view illustrating the eighth embodiment of the present invention and FIG. 16 and FIG. 17 are type diagrams for illustrating of the operation of the same embodiment. In these diagrams, the same component parts as those of the suspension of the first embodiment illustrated in FIGS. 1 to 3 are denoted by the same reference numerals.

The wheel 1, the knuckle 2, and the lower arm 4 in this embodiment are constructed identically to those of the first embodiment described above and, therefore, will be omitted from the following description.

The difference of the present embodiment in construction from the first embodiment resides in the construction for attachment of an upper arm 63 and a rigid member 69.

To be specific, the upper arm 63 of the present embodiment comprises a knuckle side upper arm 66 and a vehicle side upper arm 67, which are each formed of an A type arm. Arm parts 67a, 67b which constitute the basal end of the vehicle side upper arm 67, similarly to the lower arm 4, are connected to the body or the frame 5 by means of the bush 10 (FIG. 16). The vehicle side upper arm 67 is revolved around the vibrating axis 15. Further, in the suspension of the present embodiment, the leading end 4c of the lower arm 4 and a leading end 67c of the vehicle side upper arm 67 are interconnected through the medium of the rigid member 69. The rigid member 69 and the lower arm 4 are so interconnected that the rigid member 69 may be revolved around the vibrating axis 16 relative to the lower arm 4 and the rigid member 69 and the vehicle side upper arm 67 are so interconnected that the rigid member 69 will be revolved around the vibrating axis 17 relative to the vehicle side upper arm 67.

Arm parts 66a, 66b of the knuckle side upper arm 66 are connected to the rigid member 69 through the medium of the vibrating axis 68. The knuckle side upper arm 66 and the rigid member 69 are revolved relative to each other around the vibrating axis 68. The knuckle side upper arm 66, therefore, is revolved around the vibrating axis 68 relative to the rigid member 69 and, at the same time, around the vibration axis 17 relative to the vehicle side upper arm 67. Then, relative to the automobile body (frame 5), it is revolved around the vibrating axis 15 through the medium of the rigid member 69 and the vehicle side upper arm 67.

The vehicle side upper arm 67, the knuckle side upper arm 66, the knuckle 2, and the rigid member 69 jointly constitute a link mechanism as described above.

Now, the operation of the suspension of the present embodiment will be described below.

FIG. 16 is a half front view illustrating the suspension of the present embodiment attached to an automobile as observed from the front side of the vehicle and FIG. 17 is a half front view typically illustrating the suspension of the same embodiment posed when the wheel is moved upwardly.

While the automobile is in the process of a straight travel, the length of the upper arm 63 equals the rectilinear length L1 from the ball joint 12 to the bush 10 as illustrated in FIG. 16. When the automobile body is gyrated in this state or when the wheel 1 runs on an object projecting from the road surface, for example, the position of the wheel 1 relative to the frame 5 is moved upwardly and the lower arm 4 is consequently revolved upwardly around the vibrating axis 14. As a result, the rigid member 69 attached to this lower arm 4 is made to push up the vehicle side upper arm 67. Then, there arises a difference between the angle of vibration of the lower arm 4 and the angle of vibration of the vehicle side upper arm 67 because, in the present embodiment, the length between the bush 11 and the lower end of the rigid member 69 is set to differ from the length between the bush 10 and the upper end of the rigid member 69. As a result, the connecting part between the vehicle side upper arm 67 and the rigid member 69 is bent with a stated angle and the rigid member 69, i.e. the connecting part between the rigid member 69 and the knuckle side upper arm 66, is consequently bent by a stated angle and the length of the upper arm 63 becomes equal to the rectilinear length L2 between the ball joint 12 and the bush 10 and shorter by a stated length (L1−L2) than the rectilinear length existing during a straight travel. The wheel 1, therefore, assumes a stated camber angle.

The suspension of the present embodiment is enabled to adjust the characteristic of camber variation for a fixed roll center height and a fixed scuff variation by suitably selecting the lengths of the vehicle side upper arm 67 and the knuckle side upper arm 66, the length of the rigid member 69, and the positions of attachment of the knuckle side upper arm 66 to the rigid member 69 without requiring any change in the positions of attachment of the upper arm 63 and the lower arm 4 to the frame 5, the position of attachment thereof to the knuckle 2, the lengths of the two arms 63, 4, etc. This fact adds noticeably to the freedom of suspension design ensures provision of satisfactory operating stability for the suspension.

Moreover, the possibility that a drawing power will be exerted in the axial direction of the ball stud on the ball joints 12, 13 is nil because the knuckle side upper arm 66 is bent at the vibrating axis 68 when the upper arm 63 and the lower arm 4 are vibrated and the rigid member 69 is consequently made to push up the vehicle side upper arm 67.

NINTH EMBODIMENT

Figure 18:
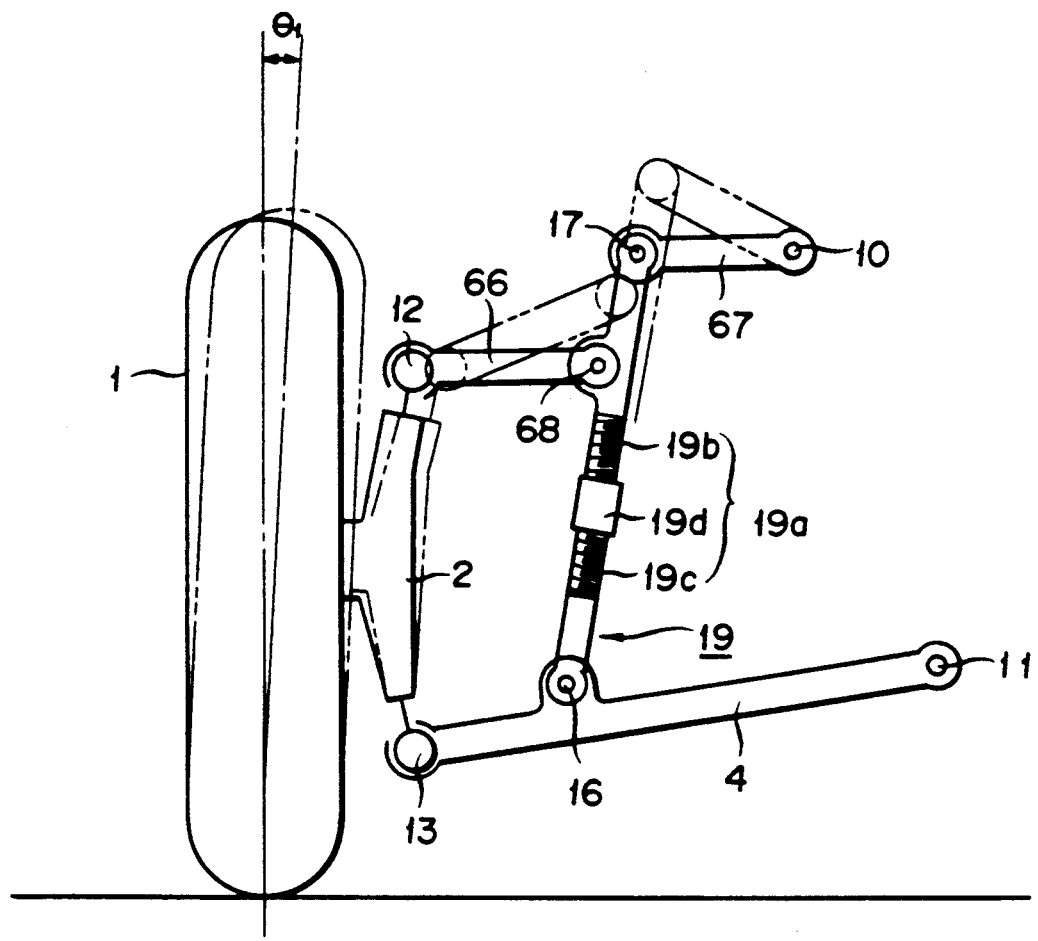
FIG. 18 is a type diagram for illustration of the operation of the ninth embodiment of the present invention.

FIG. 18 is a type diagram for illustration of the operation of the ninth embodiment of the present invention. In this diagram, the same component parts as those of the suspension of the first embodiment illustrated in FIGS. 1 to 3 and those of the suspension of the eighth embodiment illustrated in FIG. 15 to 17 are denoted by the same reference numerals.

The wheel 1, the knuckle 2, the upper arm 63 (the knuckle side upper arm 66 and the vehicle side upper arm 67), and the lower arm 4 are constructed identically to the corresponding component parts of the eighth embodiment described above and, therefore, will be omitted from the following description.

The difference of the present embodiment in construction from the eighth embodiment resides in the rigid member. To be specific, the turnbuckle 19a is formed in the central part of the rigid member 19 of the present embodiment. This turnbuckle 19a comprises a right-handed screw 19b and a left-handed screw 19c both formed on the rigid member 19 and a coupler 19d helically fitted to these screws. The rigid member 19 is contracted or extended by rotating the coupler 19d in one direction and is conversely deformed by rotating the coupler 19d in the other direction. The means for extending or contracting the rigid member 19 is not limited to the turnbuckle 19a but may be some other means which is capable of extension or contraction.

Now, the function derived from expansibly constructing the rigid member 19 will be described below.

FIG. 18 is a half cross section typically illustrating the suspension of the present embodiment as observed from the front side of the vehicle. In the diagram, the solid line represents the state of the rigid member 19 prior to the extension thereof and the two-dot chain line the state thereof subsequent to the extension.

When the length of the rigid member 19 is increased by rotating the coupler 19d of the turnbuckle 19a in the state represented by the solid line in FIG. 18, the rigid member 19 pushes up the vehicle side upper arm 67 and the rectilinear length between the connecting part of the knuckle 2 and the connecting part of the automobile body (not shown) varies in accordance as the length of the rigid member 19 is varied. The variation in the length of the rigid member 19, therefore, allows adjustment mainly of the camber angle of the wheel (indicated by the symbol "θ1" in FIG. 18).

As described above, the suspension of the present embodiment allows very easy adjustment of the camber angle because the camber angle can be adjusted mainly by extending or contracting exclusively the length of the rigid member 19.

TENTH EMBODIMENT

Figure 19:
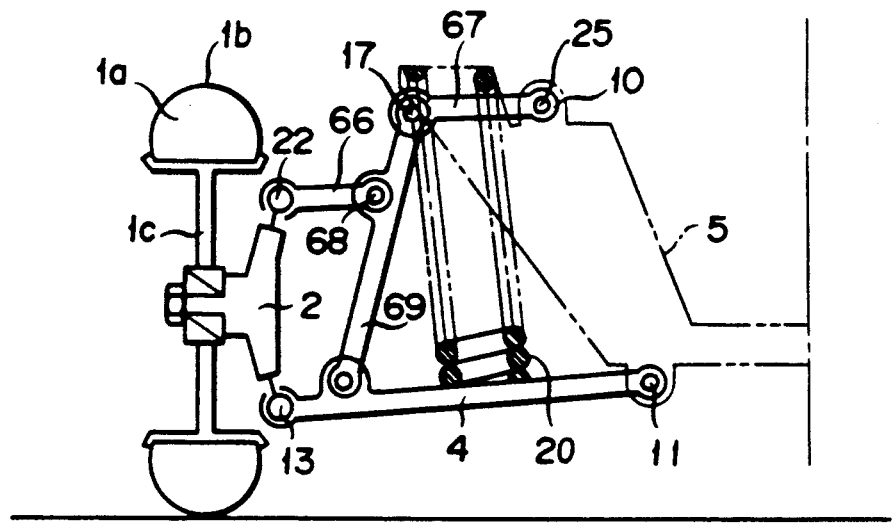
FIG. 19 and FIG. 20 are type diagrams for illustration of the operation of the tenth embodiment.
Figure 20:
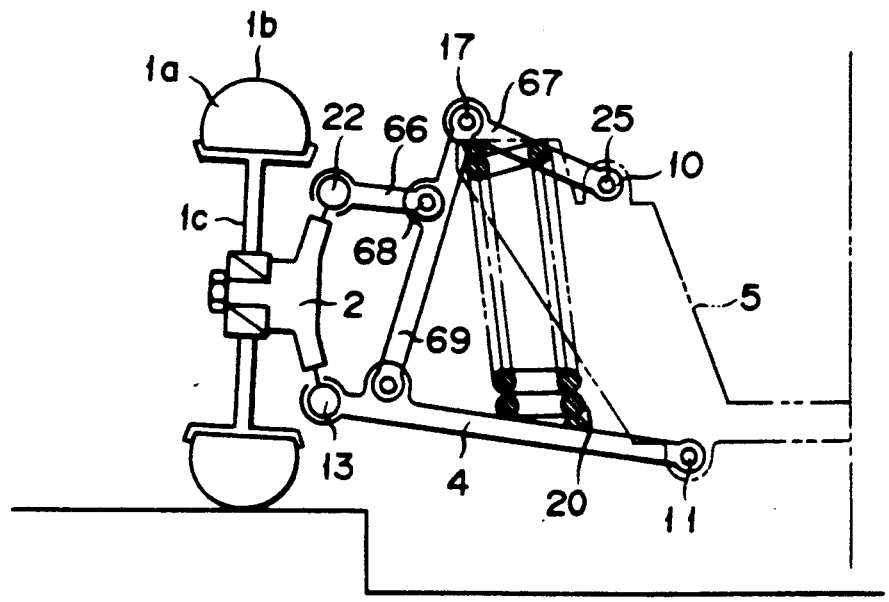

FIG. 19 and FIG. 20 are type diagrams for illustration of the operation of the tenth embodiment of the present invention; FIG. 19 being a half front view typically illustrating the suspension of the present embodiment attached to an automobile as observed from the front side of the vehicle and FIG. 20 a half front view typically illustrating the suspension of the same embodiment as posed when the wheel is moved upwardly. In these diagrams, the same component parts as those of the suspension of the first embodiment illustrated in FIGS. 1 to 3 and those of the suspension of the eighth embodiment illustrated in FIGS. 15 to 17 are denoted by the same reference numerals.

The wheel 1, the knuckle 2, the upper arm 63 (the knuckle side upper arm 66 and the vehicle side upper arm 67), the lower arm 4, and the rigid member 69 of the present embodiment are constructed identically to the corresponding component parts of the eighth embodiment and, therefore, will be omitted from the following description.

The difference of the present embodiment in construction from the eighth embodiment resides in the positions for attachment of the ball joint 22, the vibrating axis 17, and the vibrating axis 25. To be specific, the ball joint 22 of the present embodiment is seated inside of the outer peripheral ridge 1b of the wheel 1, especially inside of the wheel 1, for the purpose of protection from the dust, water, etc. splashed by the tire 1a while the automobile is in travel.

Further, the positions for attachment of the vibrating axis 17 and the vibrating axis 25 in the present embodiment are set at levels higher in the vertical direction of the automobile body than the position for attachment of the ball joint 22 mentioned above. Heretofore, the idea of high-mounting the upper arm 63 has been conceived for the purpose of heightening the rigidity of the suspension to the extent of withstanding the external force exerted in the lateral direction on the wheel 1 while the automobile body is in the process of a gyration. This concept, however, has failed to produce a proper construction capable of simultaneously satisfying rigidification of the suspension and protection of the ball joint because the high-mounting inevitably requires the ball joint 22 to be disposed outside the wheel 1, i.e. a site susceptible of the influence of muddy water splashed by the tire 1c. The desire to install the ball joint 22 inside of the outer peripheral ridge 1b of the wheel 1 is fulfilled by dividing the upper arm 63 into the vehicle side upper arm 67 and the knuckle side upper arm 66 as in the present embodiment. Then, the rigidification of the suspension is realized by arbitrarily setting the roll center of the automobile body and, at the same time, high-mounting the vehicle side upper arm 67.

Further, in the present embodiment, the otherwise possible infiltration of dust, water, etc. into the ball joint 22 can be precluded because the ball joint 22 is positioned inside of the outer peripheral edge 1b of the wheel 1. The rigidity necessary for withstanding the external force exerted by the wheel 1 in the lateral direction upon the suspension is high because the position 10 for attachment of the vehicle side upper arm 67 to the automobile body and the position for attachment of the vehicle side upper arm 67 to the knuckle side upper arm 66 are set at levels higher in the vertical direction of the automobile body than the ball joint 22 mentioned above.

The suspension of the present embodiment excels in rigidity and provides ample protection for the ball joint as described above.

ELEVENTH EMBODIMENT

Figure 21:
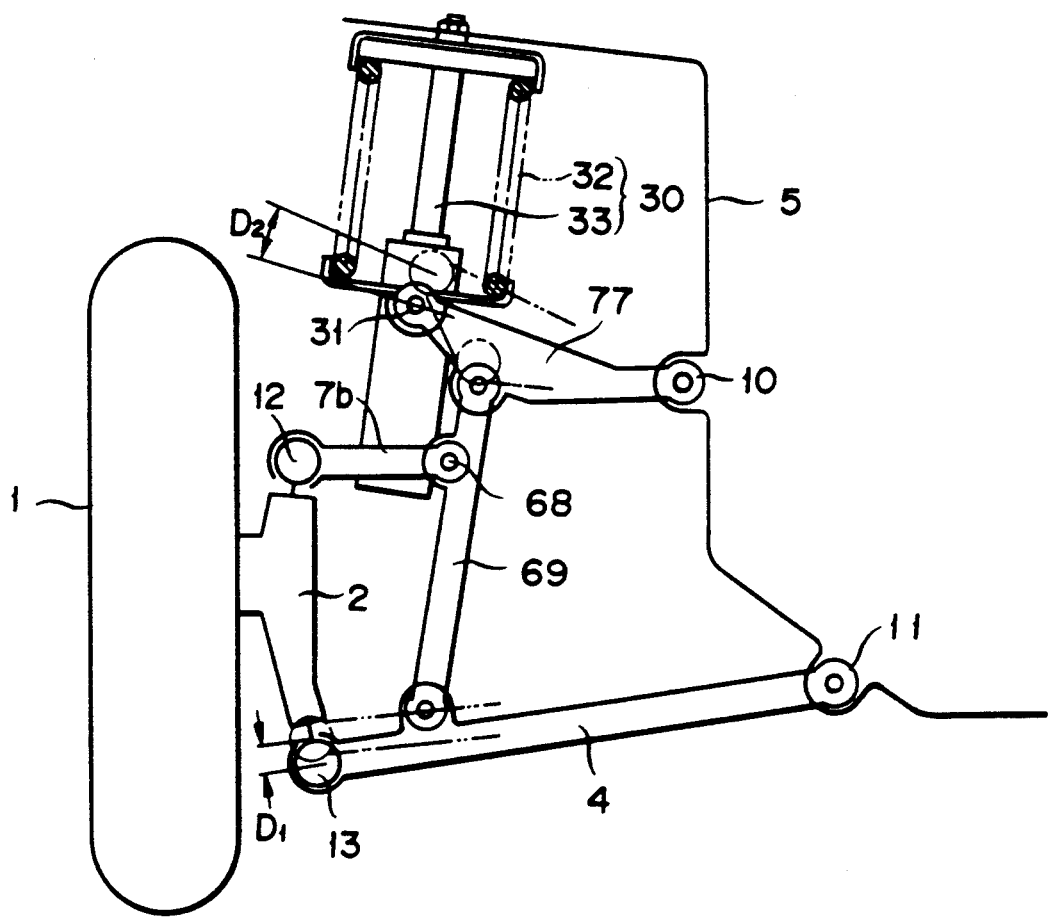
FIG. 21 is a type diagram illustrating the eleventh embodiment of the present invention.

FIG. 21 is a type diagram illustrating the 11th embodiment of the present invention. In the diagram, the same component parts as those of the suspension of the first embodiment illustrated in FIGS. 1 to 3 and those of the suspension of the eighth embodiment illustrated in FIGS. 15 to 17 are denoted by the same reference numerals.

The wheel 1, the knuckle 2, the lower arm 4, and the rigid member 69 of the present embodiment are constructed identically to the corresponding component parts of the eighth embodiment and, therefore, will be omitted from the description. The difference of the present embodiment in construction from the eighth embodiment resides in an upper arm 73 (a knuckle side upper arm 76 and a vehicle side upper arm 77) and the spring device 30.

To be specific, the projecting part 31 is formed at the leading end of the vehicle side upper arm 77 and the spring device 30 comprising the spring 32 and the shock absorber 33 is interposed between the projecting part 31 and the automobile body 5. The spring modulus of the spring device 30, namely the size of the spring device 30, can be varied by altering the protruding length of the projecting part 31.

In the 11th embodiment constructed as described above, when the position of the wheel 1 relative to the automobile body 5 is moved upwardly, the lower arm 4 is revolved upwardly about the vibrating axis 14 with the automobile body 1 (as indicated by the symbol "D1" in FIG. 21). The rigid member 69 is consequently made to push up the vehicle side upper arm 77. At this time, the amount of movement D2 of the projecting part 31 formed at the leading end of the vehicle side upper arm 77 is larger than the amount of movement D1 of the lower arm 4. This is because the suspension of the present embodiment has the function of varying the angle of vibration of the vehicle side upper arm 77 relative to the angle of vibration of the lower arm 4 in consequence of suitable alteration of the length of the lower arm 4, the length of the vehicle side upper arm 77, and the positions for attachment of the lower end and the upper end of the rigid member 69.

As a result, the spring modulus of the spring device 30 can be set at a low level, the damping force of the shock absorber 33 can be set at a small magnitude, and the spring device 30 can be miniaturized.

TWELFTH EMBODIMENT

Figure 22:
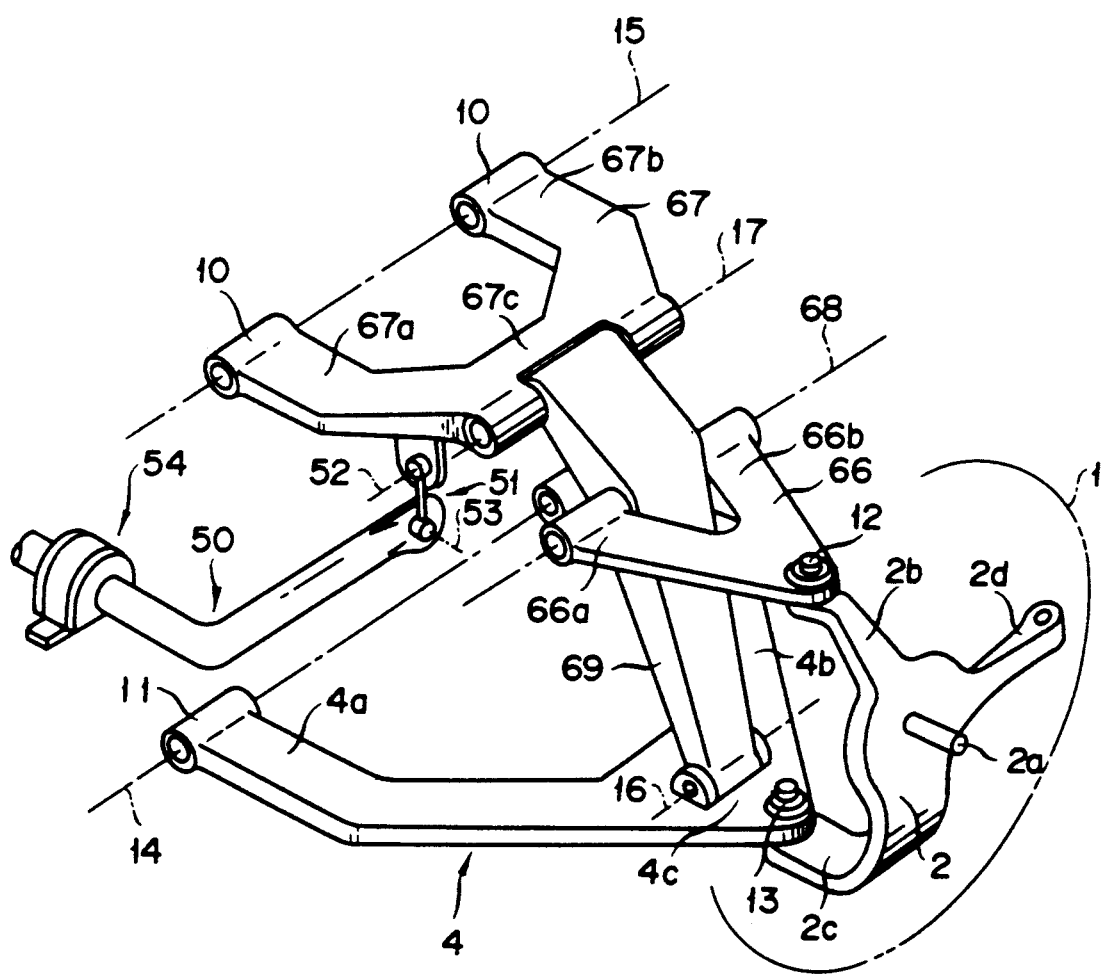
FIG. 22 is a perspective view illustrating the twelfth embodiment of the present invention.
Figure 23:
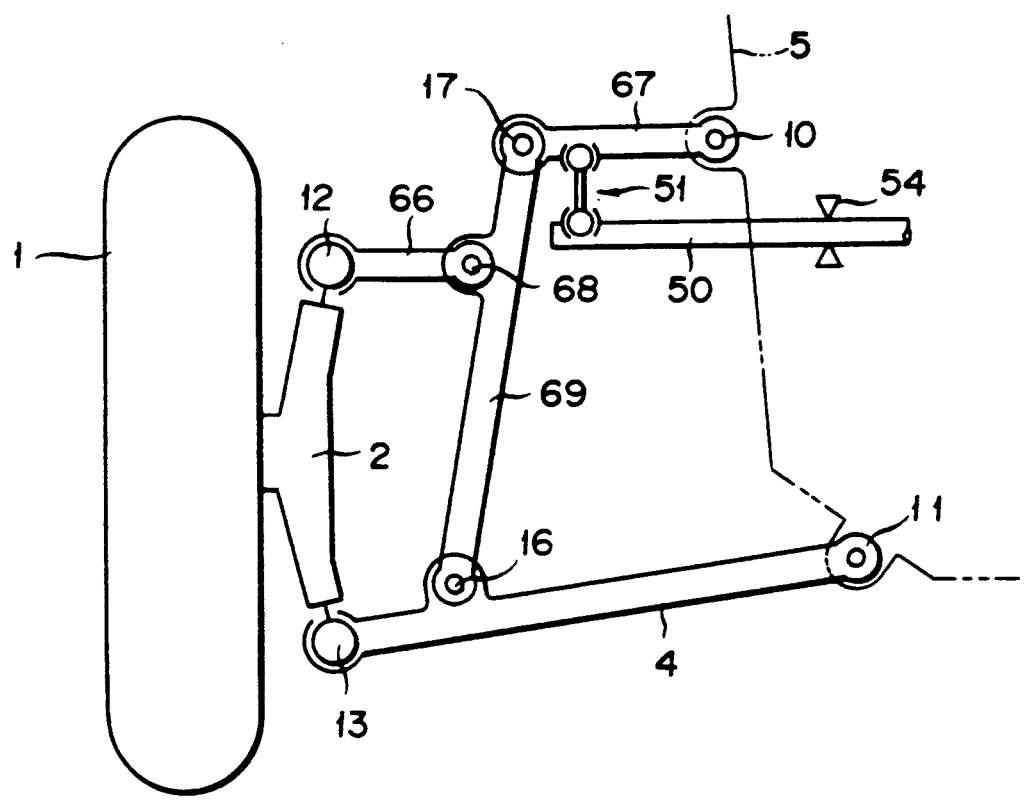
FIG. 23 is a type diagram for illustration of the operation of the twelfth embodiment.

FIG. 22 is a perspective view illustrating the 12th embodiment of the present invention and FIG. 23 is a type diagram for illustration of the operation of the same embodiment. In these diagrams, the same component parts as those of the suspension of the first embodiment illustrated in FIGS. 1 to 3 and those of the suspension of the eighth embodiment illustrating in FIGS. 15 to 17 are denoted by the same reference numerals.

The wheel 1, the knuckle 2, the upper arm 63, the lower arm 4, and the rigid member 69 of the present embodiment are constructed identically to the corresponding component parts of the eighth embodiment described above and, therefore, will be omitted from the following description.

The difference of the present embodiment in construction from the eighth embodiment resides in the additional incorporation of the stabilizer 50.

In the suspension of the present embodiment, the stabilizer 50 which is a torsion bar has the leading end thereof attached to a point near the leading end of the vehicle side upper arm 67 through the medium of the joint 51. This joint is so adapted as to be revolved freely around the axis 52 in the part of attachment thereof to the vehicle upper arm 67 and it is further adapted so as to be revolved around the axis 53 in the part of attachment thereof to the stabilizer 50. As a result, the stabilizer 50 is allowed to follow the vertical movement of the vehicle side upper arm 67 and confer a proper restoring power on the vehicle side upper arm 67 and consequently on the wheel 1. The other end of the stabilizer 50 is similarly attached to the other wheel and the middle part of the stabilizer 50 is supported on the automobile body by means of the bushes 54, 54 (only one of which is illustrated).

Now, the operation of the suspension of the present embodiment will be described below.

When the automobile body is gyrated or when one of the lateral pair of wheels runs on an object projecting from the road surface or falls in a pit in the road surface, the position of the wheel 1 relative to the automobile body is moved upwardly or downwardly. In consequence of this movement of the wheel, the lower arm 4 is revolved upwardly or downwardly around the vibrating axis 14 as the center. As a result, the rigid member 69 attached to the lower arm 4 is made to push up the vehicle side upper arm 69 and the vehicle side upper arm 67 is revolved around the bush 10.

In this case, therefore, when the leading end of the stabilizer 50 is attached near the leading end of the vehicle side upper arm 67, the suspension of the present embodiment is vested with as high restoring power as when this attachment is made near the leading end of the lower arm 4 because the suspension has the function of allowing desired variation in the angle of vibration of the vehicle side upper arm 67 relative to the angle of vibration of the lower arm 4 in consequence of suitable alteration of the length of the lower arm 4 (indicated by the symbol "L" in FIG. 23), the length of the vehicle side upper arm 67, and the positions for attachment of the lower end (indicated by the symbol "l" in FIG. 23) and the upper end of the rigid member 69.

In the design of a suspension, therefore, even when the position for attachment of the stabilizer 50 or the layout of adjacent component parts is conspicuously restricted, a suspension capable of manifesting a desired restoring power can be obtained by suitably selecting the length of the lower arm 4, the length of the vehicle side upper arm 67, the positions for attachment of the lower end and the upper end of the rigid member 69, and the like.

INDUSTRIAL APPLICABILITY

As described above, the suspension of the present invention is enabled to acquire a varied characteristic of camber variation for a fixed roll center and a fixed scuff variation through suitable selection of the lengths of the vehicle side upper arm and the knuckle side upper arm, the length of the rigid member, and the position for attachment of the knuckle side upper arm to the rigid member without requiring any change in the positions for attachment of the upper arm and the lower arm to the automobile body, the position for attachment thereof to the knuckle, the lengths of the two arms, etc. This fact adds conspicously to the freedom of design of the suspension and allows the suspension to acquire fully satisfactory operational stability. Moreover, the adjustment of the camber angle can be effected very easily because this adjustment can be carried out mainly by extending or contracting exclusively the length of the rigid member without requiring installation of an eccentric cam at the position for attachment of the upper arm or the lower arm to the automobile body.

Besides, the suspension excels in rigidity and provides ample protection for the ball joint.

This invention, accordingly, provides a suspension which allows the positions for attachment of the control arms to the automobile body to be freely set and the caster variation to be set at a desired value during a gyration of the automobile.

Since the angle of vibration of the vehicle side upper arm relative to the angle of vibration of the lower arm is varied by suitable alteration of the length of the lower arm, the length of the vehicle side upper arm, and the positions for attachment of the lower end and the upper end of the rigid member, the spring modulus of the spring device can be set at a small magnitude, the damping power of the shock absorber can be set at a low level, and the spring device can be miniaturized.

Further, in the design of a suspension, even when the position for attachment of the stabilizer or the layout of adjacent component parts is conspicuously restricted, a suspension which is vested with a desired restoring power can be obtained by suitable selection of the length of the lower arm, the length of the vehicle side upper arm, the positions for attachment of the lower end and the upper end of the rigid member, etc. Moreover, this suspension can be manufactured in a compact size.

Owing to the construction described above, the independent suspension of the present invention can be advantageously used in the Wishbone type independent suspensions which are furnished for the front wheels or the rear wheels of an automobile.

We claim:

1. An independent wheel suspension for suspending a wheel on a frame of an automotive vehicle, said suspension comprising:
   wheel carrier means for rotatably supporting a wheel, said wheel carrier means including an upper and lower portion;
   lower arm means connecting said lower portion of said wheel carrier means to said frame;
   upper arm means for connecting said upper portion of said wheel carrier means to said frame, said upper arm means including a first upper arm member pivotably connected to said upper portion of said wheel carrier means and a second upper arm member pivotably connected to said second upper arm member at a first vibrating axis; and
   linking means for linking said second upper arm member to said lower arm means,
   said linking means moves said second arm member upwardly thereby moving said first vibrating axis upwardly so that a rectilinear length from said wheel carrier means to said frame is shortened by a predetermined length to decrease the distance between said upper portion of said wheel carrier means and said frame when said wheel carrier means moves a distance in an upward direction which is larger than a predetermined value.

2. The independent wheel suspension according to claim 1, wherein said lower arm means allows said wheel carrier means to move upwards and downwards relative to said frame.

3. The independent wheel suspension according to claim 2, wherein one end of said linking means is pivotably connected to said lower arm means, and the other end of said linking means is pivotably connected to said upper arm means.

4. The independent wheel suspension according to claim 3, wherein said first upper arm member is pivotably connected to said second upper arm member.

5. An independent wheel suspension according to claim 1, wherein one end of said linking means is pivotably connected to said lower arm means and the other end of said linking means is pivotably connected to said second upper arm member at a second vibrating axis, said second vibrating axis being between said first vibrating axis and the pivotal connection of said second arm member and said frame, said linking means allowing said second vibrating axis to move upwards when said wheel carrier means moves upwards relative to said frame.

6. An independent wheel suspension according to claim 1, wherein said lower arm means is pivotably connected to said wheel carrier means and said upper arm means is pivotably connected to said wheel carrier means.

7. The independent wheel suspension according to claim 1 wherein said linking means includes a rigid member for adjusting the camber angle of the wheel.

* * * * *